US010941725B2

(12) United States Patent
Calhoun (10) Patent No.: US 10,941,725 B2
(45) Date of Patent: Mar. 9, 2021

(54) VIBRATION FEEDBACK CONTROLLER

(71) Applicant: Rolls-Royce Corporation, Indianapolis, IN (US)

(72) Inventor: Keith Calhoun, Carmel, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 338 days.

(21) Appl. No.: 15/634,640

(22) Filed: Jun. 27, 2017

(65) Prior Publication Data

US 2018/0372016 A1 Dec. 27, 2018

(51) Int. Cl.
| | | |
|---|---|---|
| *G05B 13/02* | (2006.01) | |
| *F02D 41/26* | (2006.01) | |
| *F02D 35/02* | (2006.01) | |
| *H02J 4/00* | (2006.01) | |
| *H02K 7/18* | (2006.01) | |
| *F02C 9/00* | (2006.01) | |

(52) U.S. Cl.
CPC ............. *F02D 41/26* (2013.01); *F02C 9/00* (2013.01); *F02D 35/027* (2013.01); *G05B 13/021* (2013.01); *H02J 4/00* (2013.01); *H02K 7/1823* (2013.01); *F05D 2270/334* (2013.01)

(58) Field of Classification Search
CPC .......... F02D 41/26; F02D 35/027; F02C 9/00; G05B 13/021; H02J 4/00; F05D 2270/053; F05D 2270/334; H02K 7/1823
USPC ......................................................... 700/280
See application file for complete search history.

(56) References Cited

U.S. PATENT DOCUMENTS

| | | | | |
|---|---|---|---|---|
| 4,031,368 | A | * | 6/1977 | Colding ............. G05B 19/4163 700/173 |
| 4,643,592 | A | * | 2/1987 | Lewis ..................... F16C 17/03 384/100 |
| 6,928,370 | B2 | | 8/2005 | Anuzis et al. |
| 7,308,322 | B1 | | 12/2007 | Discenzo et al. |
| 9,435,267 | B2 | | 9/2016 | Myer et al. |
| 2005/0096873 | A1 | * | 5/2005 | Klein ..................... G01H 1/006 702/184 |
| 2009/0110541 | A1 | * | 4/2009 | Southwick .............. F01D 21/04 415/119 |
| 2012/0035885 | A1 | | 2/2012 | Tarassenko et al. |
| 2013/0300337 | A1 | * | 11/2013 | Nagaoka .............. G05B 19/416 318/671 |

(Continued)

OTHER PUBLICATIONS

Clifton, "Condition Monitoring of Gas-Turbine Engines", Dec. 2005, 60 pgs.

(Continued)

*Primary Examiner* — Kenneth M Lo
*Assistant Examiner* — Michael W Choi
(74) *Attorney, Agent, or Firm* — Shumaker & Sieffert, P.A.

(57) ABSTRACT

The disclosure includes a system that includes an adaptive control module for an engine. The adaptive control module is configured to receive a power input signal and receive, from an engine vibration sensor, a vibration signal indicative of an operating condition of the engine. The adaptive control module is further configured to determine, using a set of control laws, a power demand signal based on inputs including the power input signal and the vibration signal. The adaptive control module is further configured to output the power demand signal to at least one component of the engine.

18 Claims, 6 Drawing Sheets

(56) References Cited

U.S. PATENT DOCUMENTS

2015/0007574 A1* 1/2015 Morgan .................... F02C 9/28
                                                            60/772
2016/0187227 A1    6/2016 Anuzis et al.

OTHER PUBLICATIONS

Clifton et al., "A Framework for Novelty Detection in Jet Engine Vibration Data", Key Engineering Materials vol. 347, 2007, 6 pgs. Applicant points out, in accordance with MPEP 609.04(a), that the year of publication, 2007, is sufficiently earlier than the effective U.S. filing date, Jun. 27, 2017, so that the particular month of publication is not in issue.
Clifton, "Novelty Detection with Extreme Value Theory in Jet Engine Vibration Data" 2009, 244 pgs. Applicant points out, in accordance with MPEP 609.04(a), that the year of publication, 2009, is sufficiently earlier than the effective U.S. filing date, Jun. 27, 2017, so that the particular month of publication is not in issue.

\* cited by examiner

VIBRATION FEEDBACK CONTROLLER

TECHNICAL FIELD

The disclosure relates to control of engines.

BACKGROUND

Certain measurable engine variables may be used to indicate a condition of a gas turbine engine. These condition indicators may be used to detect irregularities in engine operation for further diagnosis. For example, performance and vibration data may be collected from an engine and analyzed offline by one or more experts. An expert may primarily review the performance data and compare the performance data to simulated results to determine a condition of the engine. An expert may also review the vibration data for changes in vibration characteristics. If a change in vibration characteristics is identified, the engine may undergo further diagnosis and testing to identify a problem.

SUMMARY

In some examples, a system includes an adaptive control module for an engine. The adaptive control module is configured to receive a power input signal and receive, from an engine vibration sensor, a vibration signal indicative of an operating condition of the engine. The adaptive control module is further configured to determine, using a set of control laws, a power demand signal based on inputs including the power input signal and the vibration signal. The adaptive control module is further configured to output the power demand signal to at least one component of the engine.

In some examples, a method includes receiving a power input signal, by an adaptive control module for an engine, a power input signal. The method also includes receiving, by the adaptive control module, from an engine vibration sensor, a vibration signal indicative of an operating condition of the engine. The method further includes determining, by the adaptive control module, using a set of control laws, a power demand signal based on inputs including the power input signal and the vibration signal. The method further includes outputting, by the adaptive control module, the power demand signal to at least one component of the engine.

In some examples, a computer-readable storage medium stores instructions that, when executed, cause a processor to receive, by an adaptive control module for an engine, a power input signal. The instructions also cause a processor to receive, by the adaptive control module, from an engine vibration sensor, a vibration signal indicative of an operating condition of the engine. The instructions also cause a processor to determine, by the adaptive control module, using a set of control laws, a power demand signal based on inputs including the power input signal and the vibration signal. The instructions also cause a processor to output, by the adaptive control module, the power demand signal to at least one component of the engine.

The details of one or more examples are set forth in the accompanying drawings and the description below. Other features, objects, and advantages of the disclosure will be apparent from the description and drawings, and from the claims.

DETAILED DESCRIPTION

The disclosure describes systems and techniques for managing operation of an engine. Engines are designed to avoid operation at excessive vibration. An engine may be operated at degraded conditions until an operational limit is reached. The operational limit is based on a tracked engine order correlated to shaft speed of the engine as designed, rather than as-built. The tracked engine order represents conditions that correspond to excessive vibration. The resulting operational limit may account for variation in engine components and engine component combination, resulting in design tolerances for the entire engine model, rather than the particular engine. During operation, an engine operator may manually adjust engine operation based on tracked engine order information correlated to excessive vibration conditions, rather than real-time vibration date for a particular engine.

An engine may have a unique vibration signature due to contributions and interactions of engine components arranged in a particular combination for the particular engine. For example, manufacturing variances may cause variation between units within a particular engine model or configuration. This vibration signature may have certain characteristics, such as a resonant vibration amplitude or frequency, associated with the contributions and interactions of the engine components. Engine components may deteriorate during engine operation. As components deteriorate, the vibration signature may change, such as by increasing in amplitude, increasing in bandwidth, changing in frequency, or the like.

In some examples, an adaptive control module may use vibration data to control an engine. The adaptive control module may receive a power input signal for the engine. The adaptive control module may also receive a vibration signal from an engine vibration sensor. The vibration signal may be representative of vibration of one or more components of the engine and may be indicative of an operating condition of the engine. The adaptive control module may determine a power demand signal based on the power input signal and the vibration signal. The adaptive control module may output the power demand signal to at least one component of the engine, such as an actuator associated with power control of the engine.

In some examples, the adaptive control module may use the vibration data to avoid operating the engine at conditions that cause excessive vibration. For example, the adaptive control module may receive or determine a vibration signature of the engine representing the as-built engine vibration characteristics of the engine for use as an operational baseline. The adaptive control module may use this operational baseline to establish operational limits of the engine. During engine operation, the adaptive control module may receive vibration data from the engine and control operation of the engine to maintain engine vibration within the operational limits. Because the operational limits are based on the engine as-built and used to limit operation based on actual vibration data from the engine, the adaptive control module may operate the engine with smaller operational tolerances than a controller that uses operational limits based on an engine as designed or that does not use actual vibration data from the engine to control power.

In some examples, the adaptive control module may use the vibration data as a health and diagnostics input indicative of a condition of the engine or one or more components of the engine. As discussed above, the adaptive control module may determine an operational baseline of the engine based on vibration data from the engine. During engine operation, the adaptive control module may receive vibration data from the engine and use the vibration data and the operational baseline to assess degradation of the engine and identify anomalous engine behavior. The adaptive control module may also identify deterioration rates of the engine or components of the engine to determine maintenance actions. By using vibration characteristics of the engine as-built, the adaptive control module may more accurately and quickly determine changes in engine component condition.

In some examples, the adaptive control module may use the vibration data as a control variable for engine performance modification. The adaptive control module may adjust engine systems to meet a requested power level while maintaining vibration under the operational limit. For example, some engine operational parameters may increase engine power with a smaller increase in vibration than other engine operational parameters. By monitoring and using vibration data to modify engine operation of one or more engine systems, the adaptive control module may maintain or increase particular engine performance parameters while reducing or maintaining vibration below an operational limit.

Figure 1:
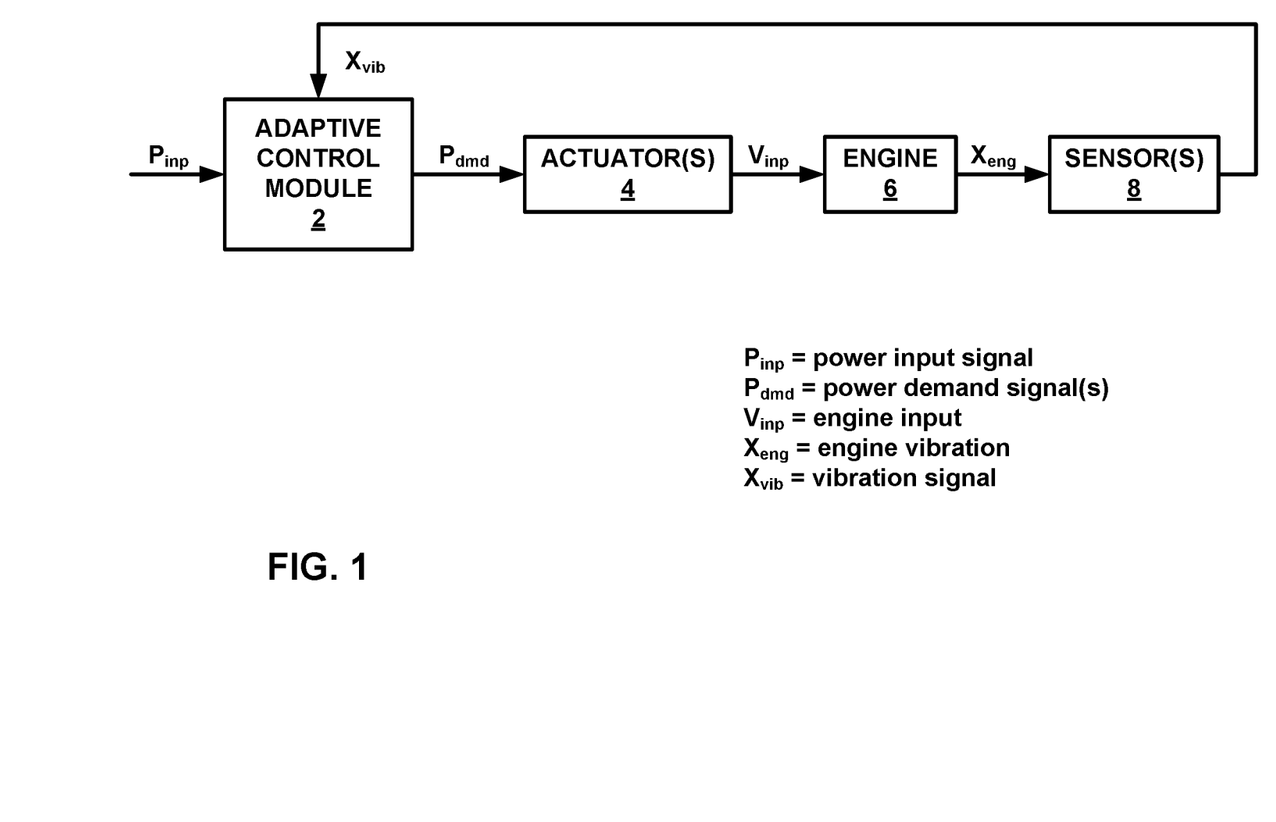
FIG. 1 is a conceptual and schematic block diagram illustrating an example system that includes an adaptive control module configured to control an engine based at least in part on vibration signal.

An adaptive control module may receive and utilize vibration data from an engine to control aspects of engine operation. FIG. 1 is a conceptual and schematic block diagram illustrating an example adaptive control module 2 configured to control an engine 6 based at least in part on vibration data from engine 6. Although FIG. 2 will describe control of engine 6, adaptive control module 2 may be used to control operation of any type of engine or system. Adaptive control module 2 may be implemented, at least in part, in hardware, software, firmware, or any combination thereof. For example, the modules included in engine control system 2 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same physical device or within separate physical devices to support the various techniques described in this disclosure. In addition, any of the described units, modules or components may be implemented together or separately as discrete but interoperable logic devices. A variety of engines may be used with adaptive control module 2 including, but not limited to, gas turbine engines such as turboprop, turbofan, turboshaft, turbojet, and the like. As described above, in some examples, adaptive control module 2 may be used in a control system for another type of engine, such as another type of internal combustion engine (e.g., a reciprocating internal combustion engine) or the like.

Adaptive control module 2 may control engine 6 via one or more actuators 4. Actuators 4 may include electronic, mechanical, or hydraulic components that receive a power demand signal, $P_{dmd}$, from adaptive control module 2 and control operation of engine 6 (e.g., one or more components of engine 6) based on the received power demand signal, $P_{dmd}$. For example, actuators 4 may include one or more components, such as a motor, a gear assembly, or the like, configured to modify a pitch of one or more airfoils to control airflow through engine 6; one or more components, such as a fuel pump or fuel injector, configured to inject fuel into a combustion chamber; one or more components, such as a motor, linear actuator, or the like, to control a position of an exhaust nozzle; or the like. Actuators 6 may output an input signal, $V_{inp}$, to engine 6 based on the power demand signal, $P_{dmd}$, and engine 6 (or one or more components of engine 6) may receive the input signal, $V_{inp}$, from actuators 4. The input signal, $V_{inp}$, may be an electrical, mechanical, or hydraulic signal or process that effects control over one or more components of engine 6, such as an airfoil, fuel pump or fuel injector, exhaust nozzle, or the like. For example, an input signal, $V_{inp}$, may include a change in electrical load on an engine generator that changes the frequency or shaft speed. In another example, an input signal, $V_{inp}$, may include a control valve position for fuel flow to engine 6. Actuators 4 may also output an actuator signal that represents the activity of actuators 4, e.g., position, change, or the like.

Engine 6 may include or be coupled to engine vibration sensor(s) 8. Engine vibration sensor(s) 8 may be configured to measure engine vibration, $X_{eng}$, from one or more engine components. Engine vibration sensor(s) 8 may be mounted on or positioned near engine 6 or components of engine 6 at various locations. In some examples, engine vibration sensor(s) 8 may be positioned at or near different components that contribute to engine vibration. For example, engine vibrations sensor(s) 8 may be mounted on a casing of engine 6 near various points corresponding to different stages of compression or expansion, near a rotating shaft, or the like. Engine vibration sensor(s) 8 may include a variety of vibration sensors including, but not limited to, piezoelectric sensors or other accelerometers, velocity sensors, proximity sensors (e.g., capacitance or eddy current sensors), laser displacement sensors, and the like. Engine vibration sensor(s) 8, may output a vibration signal indicative of vibration of engine 6 or a component of engine 6, $X_{vib}$, to adaptive control module 2. The vibration signal, $X_{vib}$, may represent an operating condition of at least one component of engine 6. An operating condition may include a level of or change in performance of an engine system or component caused by, for example, operating speed or power, malfunction of the engine system, deterioration of the engine component. The level or change in performance may be indicated by vibration characteristics of engine 6 as represented in the vibration signal, $X_{vib}$. The vibration signal, $X_{vib}$, may represent vibration characteristics such as amplitude, frequency, bandwidth, and the like.

Adaptive control module 2 may be configured to receive a power input signal, $P_{inp}$, from a control system (not shown), and at least one vibration signal, $X_{vib}$, from engine vibration sensor(s) 8 of engine 6, and output a power demand signal $P_{dmd}$ that controls operation of actuator(s) 4 of engine 6. The power input signal, $P_{inp}$, may be a signal from, for example, a control system controlled by an operator of an aircraft requesting a selected power demand for engine 6. For example, the power input signal, $P_{imp}$, may represent a throttle input.

Adaptive control module 2 may be configured to determine the power demand signal, $P_{dmd}$, based at least in part on the power input signal, $P_{inp}$, and the vibration signal, $X_{vib}$, by using a set of control laws. The set of control laws may be algorithms, gain schedules, or both with configurable parameters selected and configured to convert the power input signal, $P_{inp}$, and the vibration signal, $X_{vib}$, to the demand signal, $P_{dmd}$. In some examples, the adaptive control module 2 may adapt the control laws to reflect changes in the operating condition of engine 6 based on the vibration signal, $X_{vib}$, from engine 6. Adaptive control module 2 may output the power demand signal, $P_{dmd}$, to actuators 4. By using vibration signals, $X_{vib}$, to determine the power demand signal, $P_{dmd}$, adaptive control module 2 may control engine 6 with reduced design margins and achieve improved performance while maintaining safe operation. Example operation and configuration of adaptive control module 2 is described in more detail in FIG. 2 below.

Figure 2:
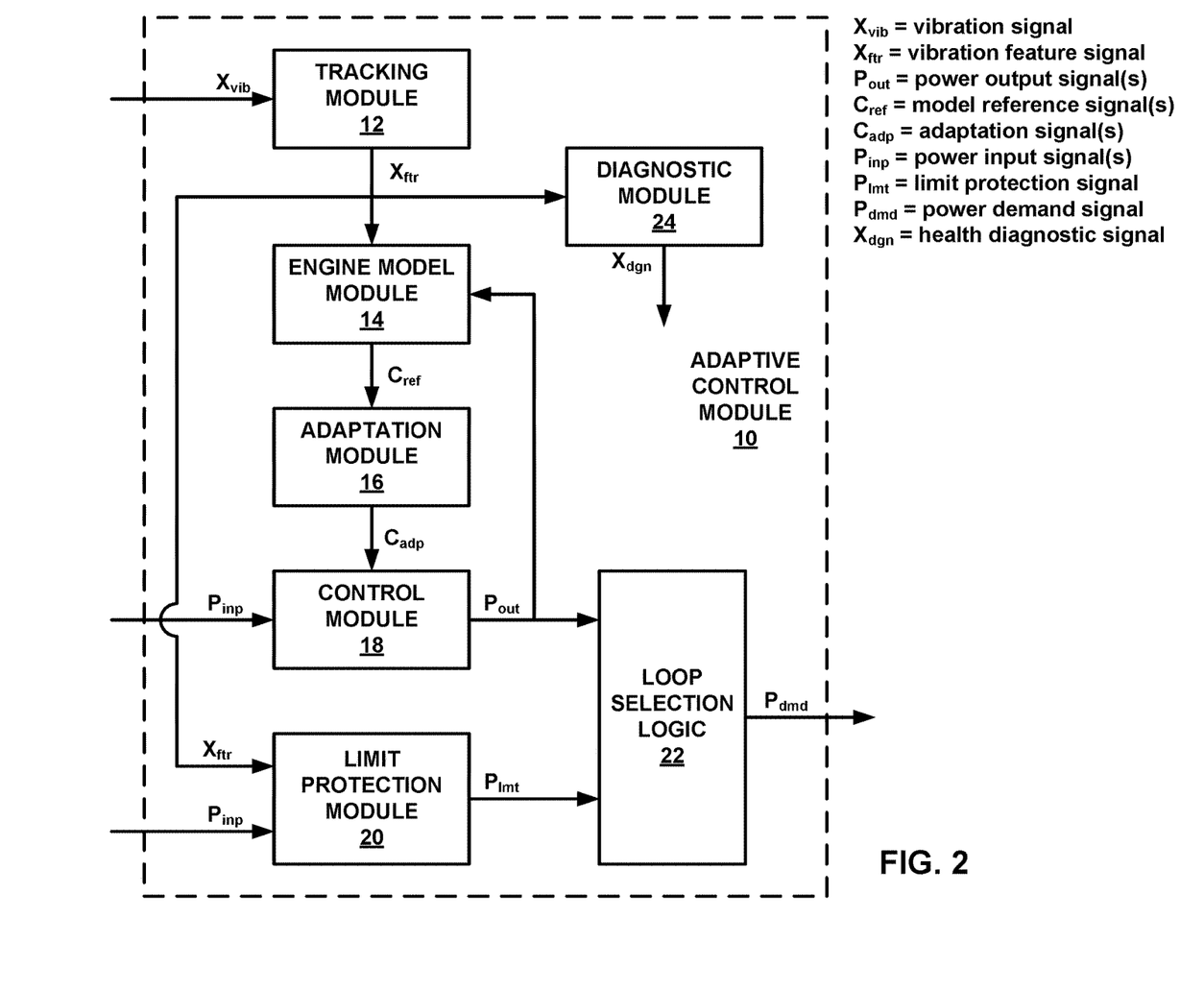
FIG. 2 is a conceptual and schematic block diagram illustrating an example adaptive control module configured to control an engine based at least in part on vibration signal that includes tracking and limit protection operation.

In some examples, adaptive control modules, such as adaptive control module 2 of FIG. 1, may be configured to use vibration data to control the operation, operational limits, and diagnostics of an engine. FIG. 2 is a conceptual and schematic block diagram illustrating an example adaptive control module 10 configured to control an engine, such as engine 6 of FIG. 1, based at least in part on vibration data. In some examples, adaptive control module 10 includes tracking module 12, engine model module 14, adaptation module 16, control module 18, limit protection module 20, loop selection logic 22, and diagnostic module 24. In other examples, adaptive control module 10 may include more or fewer modules than illustrated in FIG. 2.

In some examples, adaptive control module 10 may include tracking module 12, which may be configured to extract vibration characteristics indicative of an operating condition of an engine from the vibration signal, $X_{vib}$. Tracking module 12 may be configured to receive a vibration signal, $X_{vib}$, from a sensor of an engine, such as engine vibration sensor(s) 8 of engine 6 of FIG. 1. Tracking module 12 may be configured to determine a vibration feature signal, $X_{ftr}$, based on the vibration signal, $X_{vib}$. The vibration feature signal, $X_{ftr}$, may represent one or more vibration characteristics, such as amplitude, frequency, bandwidth, or phase, that are representative of vibration in engine 6 and correspond to engine operation. The vibration characteristics may correspond to or be associated with one or more engine components. In some examples, the vibration feature signal, $X_{ftr}$, may represent a filtered vibration signal, a tracked order signal, a vibration signature signal, or any other signal that includes vibration characteristics of the engine or engine components, as further explained below. Tracking module 12 may output the vibration feature signal, $X_{ftr}$, to engine model module 14, limit protection module 20, and/or diagnostic module 24.

In some examples, tracking module 12 may be configured to determine a filtered vibration signal based on the vibration signal, $X_{vib}$. Tracking module 12 may include a tracking filter or other pre-processing system to reduce noise in the vibration signal, $X_{vib}$. A tracking filter may filter the vibration signal, $X_{vib}$, to exclude vibration data outside particular characteristic ranges, such as frequency and amplitude, based on previous or predicted vibration behavior of engine components. For example, tracking module 12 may filter the vibration signal, $X_{vib}$, according to frequencies that correspond to the frequency of rotation of one or more engine shafts, as discussed below.

In some examples, tracking module 12 may be configured to determine a tracked order based on the vibration signal, $X_{vib}$. A tracked order is a vibration response associated with a particular engine component. A primary source of vibration in an engine is due to shaft rotation, and vibration excitation forces acting on the engine may appear at fundamental and harmonic frequencies of shafts of the engine. A tracked order may be represented as an amplitude of vibration of the engine measured at a frequency or in a frequency band that includes fundamental and/or harmonic frequencies of rotation of one or more engine shafts. Tracking module 12 may determine tracked orders by tracking frequencies of various components over a period of time and identifying characteristic or peak amplitudes. For example, tracking module 12 may store tracked orders during engine testing, at engine start-up, or through engine operation. Tracked orders may provide adaptive control module 10 with an operational baseline from which to differentiate responses of various components.

In some examples, tracking module 12 may be further configured to determine a vibration signature signal of the engine (e.g., engine 6) or engine components (e.g., low-pressure shaft and accessory components coupled to the low-pressure shaft) based on tracked orders of components at one or more fundamental frequencies or frequency bandwidths. A vibration signature is a characterization of a vibration behavior of one or more engine components. The vibration signature may be represented as an amplitude and/or phase of tracked orders for a range of component frequencies. Vibration signatures may include, but are not limited to, representations of vibration amplitude versus tracked order (order power spectrum), vibration spectra (tracked order high vibration amplitude) versus rotational speed (ZMOD representation), tracked order amplitude versus rotational speed; and the like. For example, an exemplary vibration signature of an engine may be based on tracked orders of an engine shaft having a fundamental frequency. Changes in properties of the vibration signature may indicate changes in conditions of components. For example, an increase in amplitude may indicate deterioration of engine health, while a change in a frequency may indicate potential failure of a part. The exemplary vibration signature may represent vibration behavior of the engine shaft and components coupled to the engine shaft at a variety of shaft speeds (e.g., a graph of distribution of vibration amplitudes of each tracked order at varying shaft speeds) and may provide an operational baseline for characterizing an engine and determining changes in operating condition of components of the engine. In some examples, the vibration signature of an engine may include tracked orders of pumps, motors, and other components with oscillating motions, which may not be coupled to a shaft rotation fundamental frequency. For example, a pump may be coupled to a transformer and configured to rotate at a speed unrelated to a shaft speed.

In some examples, adaptive control module 10 may be configured to use the vibration feature signal, $X_{ftr}$, as a control variable for engine performance modification. Adaptive control module 10 may include engine model module 14 to simulate engine 6 using a real-time engine model and update the real-time engine model based on the vibration feature signal, $X_{ftr}$. Engine model module 14 may receive the vibration feature signal, $X_{ftr}$, from tracking module 12 and a power output signal, $P_{out}$, from control module 18. The real-time engine model may represent a real-time operational model of the engine. Engine model module 14 may use the vibration feature signal, $X_{ftr}$, to update the real-time engine model for any operational changes in the engine, such as deterioration of one or more engine components. Engine operation at normal conditions resulting in abnormal vibration may be adjusted to produce adequate performance at an acceptable vibration level. An increase in an amplitude or shift in the phase or frequency band of the vibration feature signal, $X_{ftr}$, at a particular tracked order over time may indicate deterioration of the engine component associated with the particular frequency which may, in turn, affect engine longevity. Engine model module 14 may update the real-time engine model to indicate a particular condition of the engine component. The condition of the engine component may be further associated with particular operating limits, such as vibration amplitude.

Engine model module 14 may determine one or more reference control signals, $C_{ref}$, based on the power output signal, $X_{out}$, and the real-time engine model updated by the vibration feature signal, $X_{ftr}$. The reference control signal, $C_{ref}$, may represent a manipulated engine variable associated with operation of the engine. Engine control variables may include, for example, fuel flow and air flow. Each engine control variable may be associated with one or more engine actuator or component that controls the engine control variable. For example, fuel flow may be controlled by a fuel valve, while air flow may be controlled by variable stator vanes. Engine model module 14 may output the reference control signal, $C_{ref}$, to adaptation module 16. For example, in the exemplary lubricant pump described above, engine model module 14 may determine a reference control signal, $C_{ref}$, for the lubricant pump speed based on the reduced operating condition of the lubricant pump, whether due to reduced capability or limitation by an operating limit.

Adaptation module 16 may determine error between actual engine operation and modeled engine operation and output an adaptation signal, $C_{adp}$, that allows control module 18 to compensate for this error. Error may include, for example, degradations in performance of the engine over its life and variations in sensors and actuators of the engine that may change over time. Adaptation module 16 includes a set of adaptation laws. The set of adaptation laws may be configured to reduce or substantially cancel effects of uncertainties in adaptive control module 10. Adaptation module 16 may use engine information (not shown) and model information from engine model module 14, such as the reference control signal, $C_{ref}$, to determine an adaptation signal, $C_{adp}$, that control module 18 may use to adapt the control algorithms of the control laws so that the control laws are customized to the actuators and the engine. Adaptation module 16 may receive the reference control signal, $C_{ref}$, from real-time engine model module 14. Adaptation module 16 may determine the adaptation signal, $C_{adp}$, based on the reference control signal, $C_{ref}$. Adaptation module 16 may output the adaptation signal, $C_{adp}$, to control module 18. For example, for the exemplary lubricant pump described above, adaptation module 16 may receive the reference control signal, $C_{ref}$, that includes the reduced lubricant pump speed. Adaptation module 16 may determine an adaptation signal, $C_{adp}$, that may change a control law of control module 10 to compensate for the reduced lubricant pump speed, such as by reducing the lubricant pump speed for the deteriorated pump and increasing a lubricant pump speed for a lubricant pump in better condition for a power input, $P_{inp}$.

In some examples, adaptation module 18 may determine the adaptation signal, $C_{adp}$, based on two or more reference control signals, $C_{ref}$, and vibration information associated with engine control variables controlled by the two or more reference control signals, $C_{ref}$. Vibration information may include historical or predicted vibration feature signals, $X_{ftr}$, associated with the engine at range of operation conditions for the engine control variables. For example, system A may control engine control variable A and system B may control engine control variable B. Both engine control variable A and B may contribute to power output. However, system A may create greater vibration than system B for anticipated operational ranges. Adaptation module 16 may output an adaptation signal, $C_{adp}$, that adapts the control laws of control module 18 to balance operation of system A and system B to achieve a desired power output, $P_{out}$, while reducing vibration from the engine.

Control module 18 may receive the power input signal, $P_{inp}$, and the adaptation signal, $C_{adp}$, and generate a power output signal, $P_{out}$, based on those inputs to control the engine and/or actuators based on a set of control laws. The set of control laws may be algorithms and gain schedules with configurable parameters selected and configured to convert the power input signal, $P_{inp}$, into a power output signal, $P_{out}$, that actuators or other control components for the engine may use to control engine control variables. The set of control laws may be selected and configured, for example, based on the characteristics of components, such as sensors, actuators, and propulsion components, of the engine.

Control module 18 may receive the adaptation signal, $C_{adp}$, from adaptation module 16 and the power input signal, $P_{inp}$, from a control system (not shown). Control module 18 may determine a power output signal, $P_{out}$, based on the power input signal, $P_{inp}$, based on the set of control laws. Control module 18 may output the power output signal, $P_{out}$, to loop selection logic 22 and engine model module 14.

In some examples, control module 18 may be configured to adapt the set of control laws based on engine or vibration information contained, for example, in the adaptation signal, $C_{adp}$, to account for past or anticipated changes in the operation of the engine. Control module 18 may receive the adaptation signal, $C_{adp}$, from adaptation module 16. Control module 18 may update configurable parameters and gain schedules in the set of control laws based on the adaptation signal, $C_{adp}$, to more accurately control the engine for desired performance. Performance and configuration of adaptive control module 10 for operational modification using vibration data is described in more detail in FIG. 3.

In some examples, adaptive control module 10 may be configured to use the vibration feature signal, $X_{ftr}$, to avoid operating the engine at conditions that cause excessive vibration. Limit protection module 20 may be configured to convert the power input signal, $P_{inp}$, to a limit protection signal, $P_{lmt}$, based on the vibration feature signal, $X_{ftr}$, to prevent operation of the engine at conditions causing excessive vibration. Limit protection module 20 may have one or more limit protection control laws associated with engine variables used as engine feedback. For example, limit protection module 20 may use shaft speed information from tachometers on the engine and shaft speed/vibration correlations established for the engine model to estimate a vibration condition in the engine. The use of this shaft speed information may be associated with control laws that produce a limit protection signal, $P_{lmt}$, with a wider tolerance band and lower limit due to the shaft speed information being based on a design model, rather than the actual engine. When vibration information reflective of vibration of the actual engine during operation is available to limit protection module 20, limit protection module 20 may use control laws that produce a limit protection signal, $P_{lmt}$, with a narrower tolerance band and higher limit due to the vibration information being based on the actual engine, not the design model. Because the operational limit is based on the engine as-built and used to limit operation based on actual vibration data from the engine, the adaptive control module may operate the engine safely with smaller operational tolerances.

Limit protection module 20 may receive the power input signal, $P_{out}$, from a control system (not shown) and the vibration feature signal, $X_{ftr}$, from tracking module 12. Limit protection module 20 may determine a limit protection signal, $P_{lmt}$, based on the power input signal, $P_{out}$, and the vibration feature signal, $X_{ftr}$. The vibration feature signal, $X_{ftr}$, may modify (e.g., reduce) the tolerance of the limit protection signal so that the resulting limit protection signal may be higher than if limit protection module 20 did not analyze vibration information.

Loop selection logic 22 may be configured to select an appropriate demand signal for a particular engine operating mode or combine two or more demand signals for a comprehensive control signal. Loop selection logic 22 may be configured to receive at least one of the power output signal, $P_{out}$, or the limit protection signal, $P_{lmt}$. In some examples, loop selection logic 22 may select at least one of the power output signal, $P_{out}$, or the limit protection signal, $P_{lmt}$, for output to an actuator of the engine. In other examples, loop selection logic 22 may combine at least one of the power output signal, $P_{out}$, or the limit protection signal, $P_{lmt}$, into a combined demand signal. Loop selection logic 22 may output the power demand signal, $P_{dmd}$, to one or more actuator(s) to control a component of the engine.

In some examples, adaptive control module 10 may be configured to use the vibration feature signal, $X_{ftr}$, as a health and diagnostics input indicative of engine component condition. Adaptive control module 10 may include diagnostic module 24. Diagnostic module 24 may be configured to receive the vibration feature signal, $X_{ftr}$ and determine a health diagnostic signal, $X_{dgn}$, based on the vibration feature signal, $X_{ftr}$. The health diagnostic signal, $X_{dgn}$, may represent health information, such as deterioration, of engine components. For example, diagnostic module 24 may receive a vibration feature signal, $X_{ftr}$, that includes a high amplitude at a tracked order associated with a lubricant pump. Diagnostic module 24 may compare the high amplitude of the tracked order to a reference amplitude of the tracked order and determine that the change in amplitude exceeds or will soon exceed a limit. Diagnostic module 24 may determine a health diagnostic signal, $X_{dgn}$, that includes an anticipated remaining operational time of the lubricant pump, diagnostic information of the lubricant pump, a diagnostic warning signal, and other information associated with a condition of the lubricant pump. By using vibration characteristics of the engine as-built, the adaptive control module may more accurately and quickly determine changes in engine component condition.

In some examples, diagnostic module 24 may use the vibration feature signal, $X_{ftr}$, to monitor the engine for degradation or malfunction of engine systems or components. Diagnostic module 24 may assess degradation of the engine and identify anomalous behavior based on an operational baseline of the engine before operation and vibration data from the engine during operation. In some examples, diagnostic module 24 may track the vibration feature signal, $X_{ftr}$, from an operational baseline established at the beginning of the engine life to determine deterioration of engine components. In some examples, diagnostic module 24 may determine an operational baseline based on the vibration feature signal, $X_{ftr}$, at current or recent engine start-ups and compare real-time vibration feature signals, $X_{ftr}$, to determine anomalous behavior.

In some examples, diagnostic module 24 may use the vibration feature signal, $X_{ftr}$, to predict future engine condition for maintenance scheduling. Diagnostic module 24 may track the vibration feature signal, $X_{ftr}$, over time to determine a deterioration rate of the engine or components of the engine. Diagnostic module 24 may determine a health diagnostic signal, $X_{dgn}$, that includes the deterioration rates. Diagnostic module 24 may output the health diagnostic signal, $X_{dgn}$, to a control system (not shown) for determination of, for example, a maintenance schedule.

At engine start-up, adaptive control module 10 may determine an operational baseline for the engine. For example, tracking module 12 may determine a vibration signature of the engine at start-up based on the vibration signal, $X_{vib}$. In examples where the start-up is at the beginning of the life of the engine, the vibration signature may represent an operational baseline of healthy operation of the engine. In examples where the start-up is at the beginning of a particular instance of operation of the engine, the vibration signature may represent an operational baseline from which to identify acute system failure of any components during that particular instance of operation. The operational baseline may be used by, for example, adaptation module 16 or limit protection module 20.

During engine operation, adaptive control module 10 may use the vibration signal, $X_{vib}$, to control the engine within operational limits and at conditions to reduce vibration. In some examples, adaptive control module may monitor the vibration signal, $X_{vib}$, to determine whether engine vibration exceeds a limit. For example, limit protection module 20 may receive the vibration feature signal, $X_{ftr}$, and compare the vibration feature signal, $X_{ftr}$, against operational limits based on the operational baseline established at engine start-up. If the vibration feature signal, $X_{ftr}$, exceeds an operational limit maximum, selection logic 22 may output a power demand signal, $P_{dmd}$, that is at or below the power demand signal associated with the operational limit maximum. In response, adaptation module 16 may adjust control laws associated with a first engine control variable and a second engine control variable so that vibration may be reduced and the desired power demand signal, $P_{dmd}$, may be output from the selection logic 22.

Figure 3:
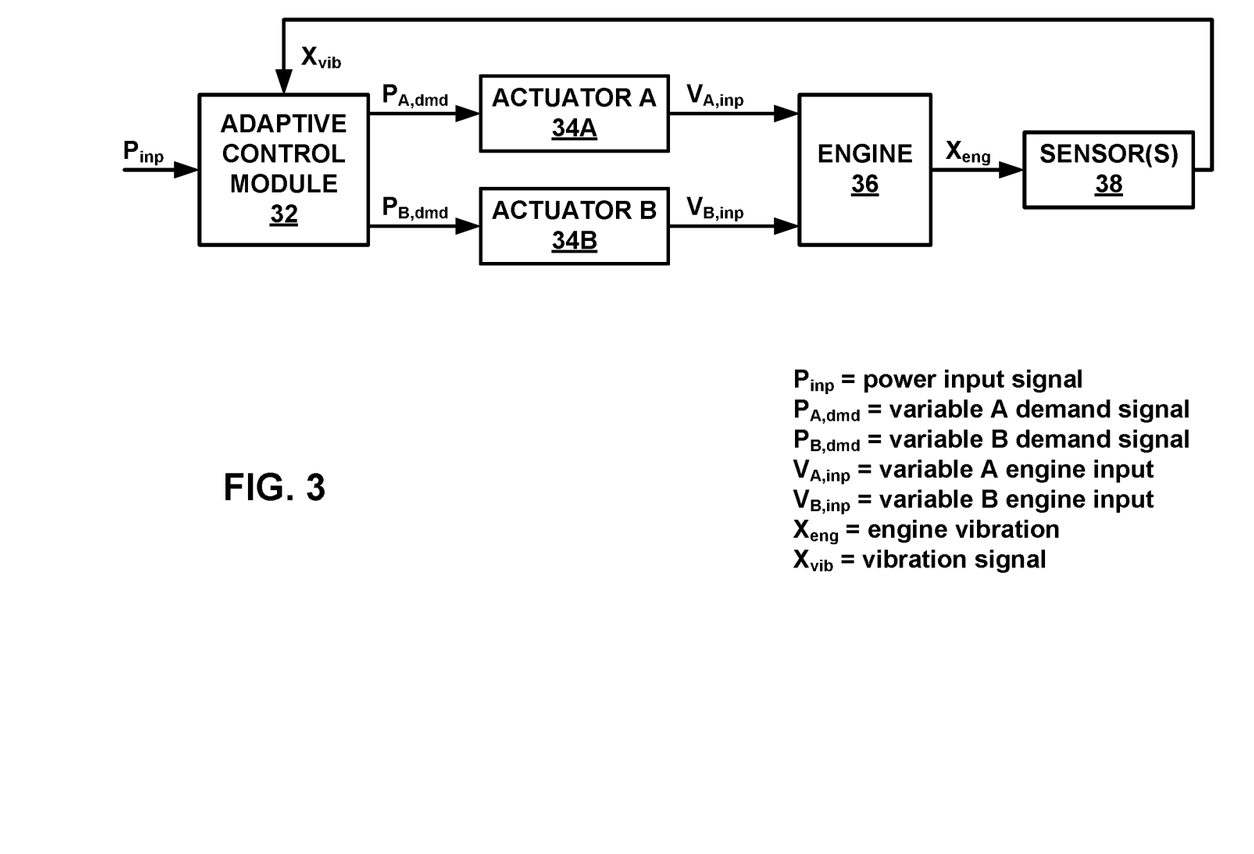
FIG. 3 is a conceptual and schematic block diagram illustrating a multiple input, multiple output adaptive control module configured to control an engine based at least in part on vibration signal.

In some examples, an adaptive control module 10 may control variables associated with two or more systems whose operation may be balanced or otherwise based on vibration data to achieve a particular power level while reducing vibration. FIG. 3 is a diagram of an adaptive control module 32 for controlling multiple components of an engine 36 for at least an engine control variable A and engine control variable B using vibration data. Engine control variable A and engine control variable B may be any controllable variables in the operation of the engine. For example, engine control variable A may be fuel flow, and engine control variable B may be airflow. In other examples, engine control variable A and engine control variable B may represent variables of redundant systems. By controlling multiple engine control variables, adaptive control module 32 may provide greater control and control flexibility over an engine 36.

Adaptive control module 32 may be configured to convert a power input signal, $P_{inp}$, to two or more engine control variable setpoints. Adaptive control module 32 may have a plurality of schedules to convert a power input signal, $P_{inp}$, to demand setpoints for a plurality of engine control variables. In the example of FIG. 3, adaptive control module 32 may receive the power input signal, $P_{inp}$. Adaptive control module 32 may determine a variable A demand setpoint for an engine control variable A and a variable B demand setpoint for an engine control variable B based on the power input signal, $P_{inp}$.

In some examples, adaptive control module 32 may use the vibration signal(s), $X_{vib}$, such as power-related vibration behavior, associated with two or more engine components to determine control law adaptations for the two or more engine components that may result in lower vibration for a particular power request. For example, engine control variable A may be associated with a first engine system that exhibits a first power-related vibration behavior, while engine control variable B may be associated with a second engine system that exhibits a second power-related vibration behavior. For a particular increase in power, the first power-related vibration behavior may produce less vibration than the second power-related vibration behavior. Adaptive control module 32 may determine adaptations for the control laws of each engine control variable so that a power contribution of the first engine system increases in relation to a power contribution of the second engine system.

Adaptive control module 32 may be configured to determine engine control variable A and engine control variable B adaptations based on at least vibration signal, $X_{vib}$, from engine vibration sensor(s) 38 of engine 36. Adaptive control module 32 may be configured to convert the engine control variable A and variable B demand setpoints into an engine control variable A demand signal, $P_{A,dmd}$, and an engine control variable B demand signal, $P_{B,dmd}$, respectively, based on control laws adapted by engine control variable A and variable B adaptations, respectively. Adaptive control module 32 may output the variable A demand signal, $P_{A,dmd}$, to an actuator A 34A to control engine control variable A through a variable A engine input, $V_{A,inp}$, and output the variable B demand signal, $P_{B,dmd}$, to an actuator B 34B to control engine control variable B through a variable B engine input, $V_{B,inp}$.

In some examples, adaptive control module 32 may control variables associated with systems of two or more engine whose operation may be balanced or otherwise based on vibration data of one or more engines to achieve a particular power level while reducing vibration. For instance, adaptive control module 32, alone or in combination with an adaptive control module of another system, may use vibration data from a remote engine to control an engine control variable from a local engine. For example, performance in a first engine may be reduced due to component deterioration which may be reflected in vibration data received by adaptive control module 32. In examples where power output is desired to be balanced between the reduced performance first engine and a second engine, adaptive control module 32 may reduce power in the second engine to match power output of the first engine. In examples where power output is desired to be optimized for a combined operation of the reduced power first engine and the second engine, such as in a distributed power system, adaptive control module 32 may increase power in the second engine so that, for example, power output in each engine may be optimized for a particular balance in vibration behavior between the first and second engine.

By using vibration data associated with two or more engine control variables and their control components, adaptive control module 32 may determine power demand signals that take into account differences in vibration behavior between engine components associated with engine control variables to reduce vibration for a particular power request.

Figure 4:
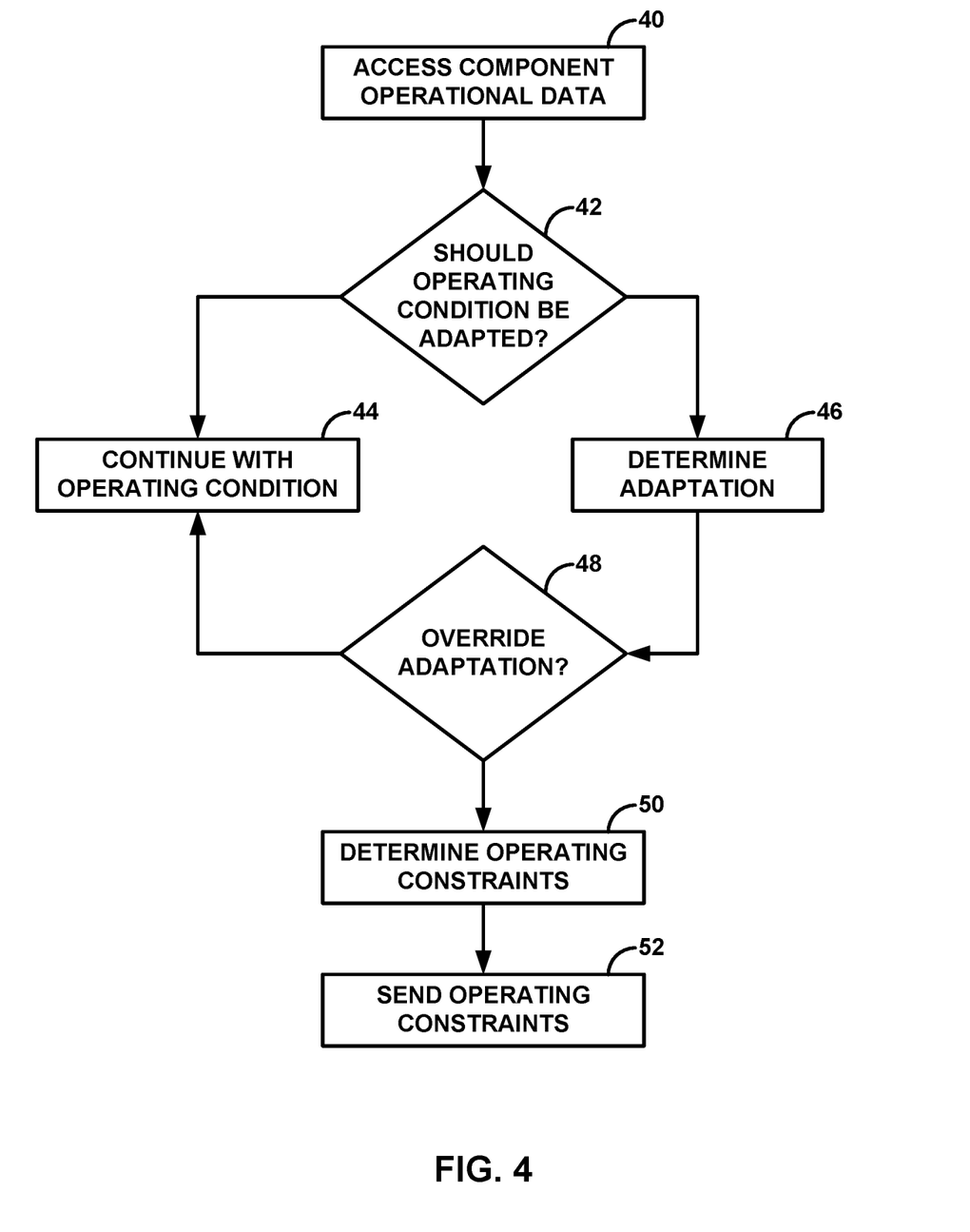
FIG. 4 is a flow diagram illustrating an example technique for controlling an engine based at least in part on vibration signal.

The systems and modules of FIGS. 1-3 may be used for control of an engine to establish operational limits or modify system control laws to reduce vibration of an engine or avoid operating an engine at excessive vibration. FIG. 4 is a flow diagram illustrating a technique for adapting control laws, such as an operational limit, for an adaptive control module of an engine based on vibration data. FIG. 4 will be described with concurrent reference to FIG. 2; however, the technique of FIG. 5 may be used in a variety of control systems.

Adaptive control module 10 may access component operational data (40). Component operational data may include vibration data associated with an engine component. For example, diagnostic module 24 may store historical vibration data of a component that is indicative of an operating condition of the component. Adaptive control module 10 may determine, based on the component operational data, whether control laws associated with an operating condition of one or more engine components should be adapted based on changes in component operating conditions. For example, adaptive control module 10 may determine that components of a plant or system are operating at a level substantially the same as an operational baseline established at the beginning of engine life or operating instance. In this situation, adaptive control module 10 may determine that operation at the present operating conditions may continue (44). On the other hand, if the components of the plant or system are not operating at a level substantially the same as an operational baseline, adaptive control module 10 may determine that the control laws of, for example, control module 18 or limit protection module 20 may be adapted (46). Alternatively, adaptive control module 10 may override a control law adaptation in response to user controls, such as controls from an operator of the engine (48).

If the control law adaptation is not overridden, adaptive control module 10 may determine new operating constraints for one or more engine components (50). For example, adaptive control module 10 may determine new control laws, such as gain schedules or parameters, that set new operating constraints on, for example, actuators of the engine. Adaptive control module 10 may send the operating constraints to components that control the engine (52). For example, adaptation module 16 may send adaptation signal(s), $C_{adp}$, to control module 18 that modify the control laws of control module 18.

Figure 5:
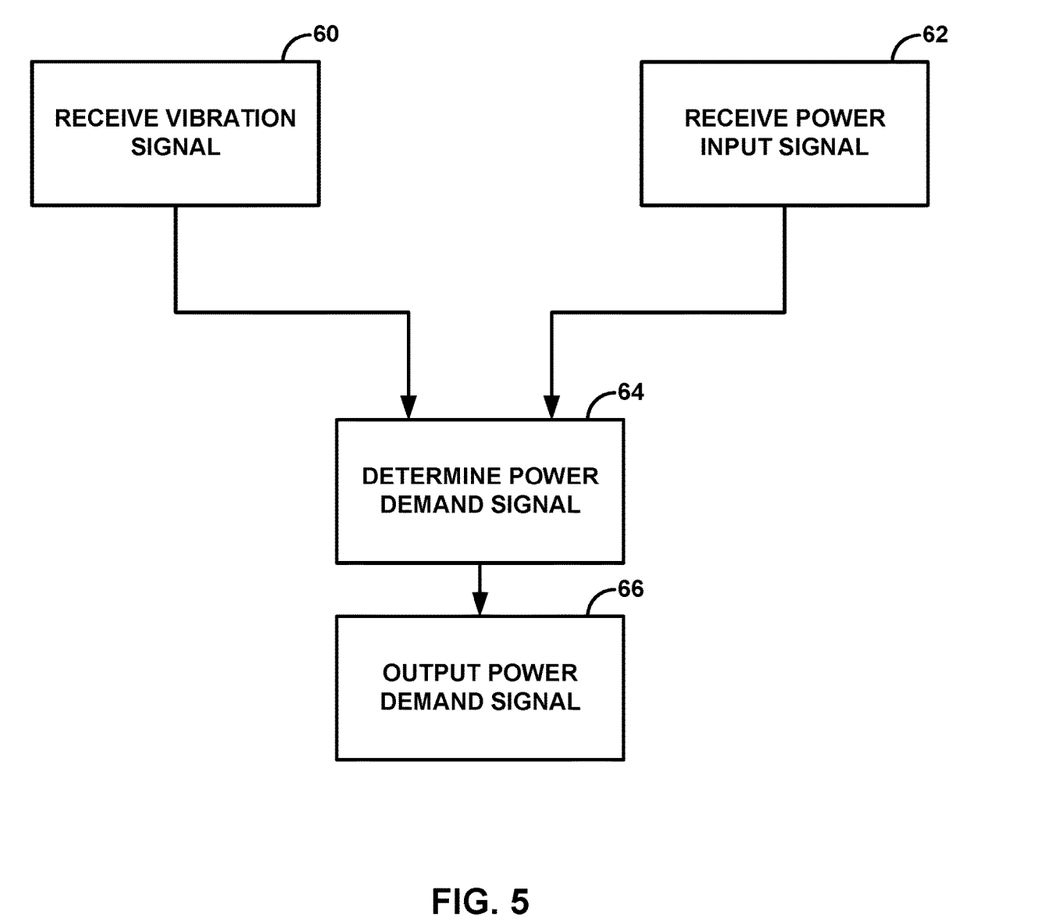
FIG. 5 is a flow diagram illustrating an example technique for controlling an engine based at least in part on vibration signal.

The systems and modules of FIGS. 1-3 may be used for control of an engine. However, other control systems may be used to manage the engine. FIG. 5 is a flow diagram illustrating an example technique for managing power in an engine. FIG. 5 will be described with concurrent reference to FIG. 1; however, the technique of FIG. 5 may be used in a variety of control systems.

Adaptive control module 2 receives a power input signal, $P_{inp}$ (62). The power input signal, $P_{inp}$, may be a signal from, for example, a control system requesting a selected power demand for the engine. Adaptive control module 2 also receives a vibration signal, $X_{vib}$, from engine 6 (60). The vibration signal, $X_{vib}$, may be indicative of an operating condition of the engine. Adaptive control module 6 determines a power demand signal, $P_{dmd}$, based on inputs including the power input signal, $P_{inp}$, and the vibration signal, $X_{vib}$ (64). Adaptive control module 2 determines demand signal, $P_{dmd}$, using a set of control laws. Adaptive control module 2 outputs the demand signal, $P_{dmd}$, to actuators 4 to control at least one component of engine 6 (66).

Figure 6:
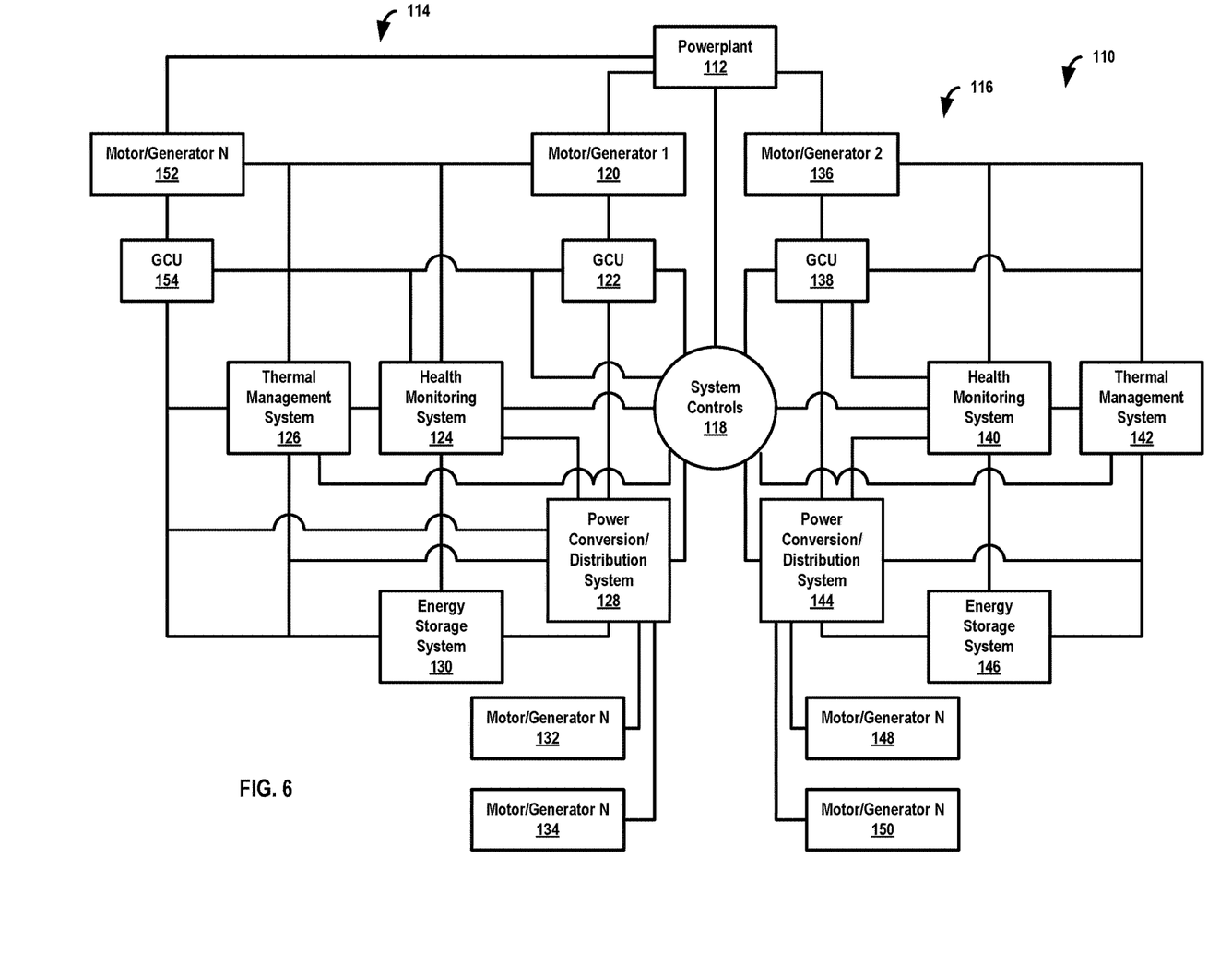
FIG. 6 is a schematic illustration of an electrical system coupled to an engine and that includes a health monitoring system for controlling an engine based at least in part on vibration signal.

The systems and modules of FIGS. 1-3 may be part of a health monitoring system integrated into circuitry of, for example, a gas turbine engine. FIG. 6 illustrates an electrical system 110 in which a power plant or engine 112, such as a gas turbine engine, provides electrical power to a first power circuit 114 and a second power circuit 116. A system controller 118 is coupled to engine 112 and also to first and second circuits 114, 116. First power circuit 114 includes a motor/generator 120 and a General Control Unit (GCU) 122 coupled thereto. GCU 122 is also coupled to other components within first power circuit 114, such as a health monitoring and prognostics system 124, a thermal management system 126, and a power conversion/distribution system 128. First power circuit 114 also includes an energy storage system 130, an expansion module 132, and application electrical load(s) 134. System controller 118 is configured to regulate power flow (such as electrical currents and voltages within system 110) to provide power to various electrical busses. The power may be DC, AC, or conversion therebetween. System controller 118 may also be configured to execute computer program instructions to control the operation of engine 112, including fuel flow, or the position of any variable geometry systems (e.g., from the flight control system of an aircraft or from a steering system of a ship).

Health monitoring system 124 monitors the health of system components, and is used to estimate component life based on vibration feedback received from components within engine 112, such as by performing the techniques described in FIG. 5 above. Thermal management system 126 includes pumps, expansion valves, and the like, as well as a controller, to provide coolant for the purposes of climate control, and other system operations. Power conversion/distribution system 128 receives electrical power from motor/generator 120 via GCU 122, and converts the power to a more useable form such as a DC voltage for storage in energy storage system 130, expansion module 132, and application electrical load(s) 134. The energy storage system 130 may include a battery or other energy storage system. Energy storage system 130 stores energy for providing power when engine 112 is not running (i.e., not generating power), but also to provide power to motor/generator 120 to provide starting power to engine 112 during startup. Expansion module 132 and application electrical load 134 represent additional electrical components that receive power from power conversion/distribution system 128.

Second power circuit 116 similarly includes a motor/generator 136 and a GCU 138 coupled thereto. GCU 138 is also coupled to other components within second power circuit 116, such as a health monitoring system 140, a thermal management system 142, and a power conversion/distribution system 144. Second power circuit 16 also includes an energy storage system 146, an expansion module 148, and application electrical load(s) 150. The components 136-150 of second power circuit 116 are similarly arranged as described with respect to first power circuit 114. Additionally, in one example electrical system 110 includes one or more additional motor/generators 152 and corresponding GCUs 154 as well, which may be coupled to a gas turbine engine as will be further described. Thus, the system 110 is modular and flexible in that it may be expanded to include a number N of motor/generators based on contemplated operating conditions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
receiving, by an adaptive control module for a gas turbine engine, a power input signal;
receiving, by the adaptive control module, from an engine vibration sensor, a vibration signal indicative of a first operating condition of an engine shaft of the gas turbine engine and a second operating condition of at least one oscillating component coupled to the engine shaft of the gas turbine engine, wherein the vibration signal represents vibration behavior of the engine shaft and the at least one oscillating component;
determining, by the adaptive control module, a vibration feature signal based on the vibration signal, wherein the vibration feature signal includes vibration characteristics of the vibration signal that correspond to the engine shaft and the at least one oscillating component coupled to the engine shaft;
comparing, by the adaptive control module, the vibration feature signal with an operational baseline of the gas turbine engine, wherein the operational baseline represents a previous operating condition of the engine shaft and the at least one oscillating component;
identifying, by the adaptive control module and based on the comparison of the vibration feature signal with the operational baseline, anomalous vibration behavior for at least one of the engine shaft or the at least one oscillating component;
adjusting, by the adaptive control module, a set of control laws for each of a first engine control variable and a second engine control variable to reduce the identified anomalous vibration behavior for at least one of the engine shaft or the at least one oscillating component, wherein each of the first and second engine control variables are controlled by one or more engine actuators;
determining, by the adaptive control module and using the set of control laws, a power demand signal based on inputs including the power input signal and the vibration feature, wherein the power demand signal includes a first power demand signal associated with the first engine control variable and a second power demand signal associated with the second engine control variable; and
outputting, by the adaptive control module, the power demand signal to the one or more engine actuators.

2. The method of claim 1, wherein the adaptive control module includes a diagnostic module, and further comprising:
receiving, by the diagnostic module, the vibration feature signal; and
determining, by the diagnostic module, a health diagnostic signal that represents a change in the first or second operating condition of the gas turbine engine.

3. The method of claim 2, further comprising determining a maintenance schedule of the gas turbine engine based on the change in the first or second operating condition of the gas turbine engine.

4. The method of claim 1, wherein the set of control laws includes limit protection schedules.

5. The method of claim 1,
further comprising adjusting the set of control laws so that the vibration signal corresponding to the anomalous vibration behavior is below an operational limit.

6. The method of claim 1, wherein the vibration signal is a vibration signature representing amplitudes of one or more tracked orders of the engine shaft and the at least one oscillatory component of the engine shaft for various speeds of the engine shaft of the gas turbine engine.

7. The method of claim 6, wherein the vibration signature includes tracked orders for at least a high-pressure shaft and a low-pressure shaft of the gas turbine engine.

8. The method of claim 1, further comprising:
updating, by the adaptive control module, a real-time engine model of the gas turbine engine based on the vibration feature signal; and
determining, by the adaptive control module and using the updated real-time engine model, a reference control signal based on at least one of the first or second power demand signals, wherein the reference control signal represents the corresponding first or second engine control variable,
wherein the respective power demand signal is determined based on inputs including the power input signal and the reference control signal.

9. The method of claim 8, further comprising:
determining, by the adaptive control module, an adaptation signal based on the reference control signal, wherein the adaptation signal compensates for an error between the reference control signal and a measurement of the respective engine control variable; and
adjusting, by the adaptive control module, the set of control laws based on the adaptation signal.

10. The method of claim 8, wherein the vibration feature signal includes at least one of an increase in amplitude, a shift in phase band, or a shift in frequency band at a particular tracked order over time, wherein the particular tracked order is associated with the engine shaft or the at least one oscillating component, and wherein the real-time engine model is updated based on the vibration feature signal to indicate deterioration of the engine shaft or the at least one oscillating component.

11. The method of claim 1, wherein identifying anomalous vibration behavior for at least one of the engine shaft or the at least one oscillating component comprises identifying at least one of an increase in amplitude, a shift in phase band, or a shift in frequency band at a particular tracked order over time, wherein the particular tracked order is associated with the engine shaft or the at least one oscillating component.

12. A system, comprising:
an adaptive control module for a gas turbine engine, wherein the adaptive control module is configured to:
receive a power input signal;
receive, from an engine vibration sensor, a vibration signal indicative of a first operating condition of an engine shaft of the gas turbine engine and a second operating condition of at least one oscillating component coupled to the engine shaft of the gas turbine engine, wherein the vibration signal represents vibration behavior of the engine shaft and the at least one oscillating component;
determine a vibration feature signal based on the vibration signal, wherein the vibration feature signal includes vibration characteristics of the vibration signal;
compare the vibration feature signal with an operational baseline of the gas turbine engine, wherein the operational baseline represents a previous operating condition of the engine shaft and the at least one oscillating component;
identify, based on the comparison of the vibration feature signal with the operational baseline, anomalous vibration behavior for at least one of the engine shaft or the at least one oscillating component;

adjust a set of control laws for each of a first engine control variable and a second engine control variable to reduce the identified anomalous vibration behavior for at least one of the engine shaft or the at least one oscillating component, wherein each of the first and second engine control variables are controlled by one or more engine actuators;

determine, using the set of control laws, a power demand signal based on inputs including the power input signal, wherein the power demand signal includes a first power demand signal associated with the first engine control variable and a second power demand signal associated with the second engine control variable; and output the power demand signal to the one or more engine actuators.

13. The system of claim 12, wherein the adaptive control module further includes a diagnostic module configured to:
receive the vibration feature signal; and
determine a health diagnostic signal that represents a change in the first or second operating condition of the gas turbine engine.

14. The system of claim 13, wherein the adaptive control module is further configured to determine a maintenance schedule of the gas turbine engine based on the change in the first or second operating condition of the gas turbine engine.

15. The system of claim 12, wherein the set of control laws includes limit protection schedules.

16. The system of claim 12,
wherein the adaptive control module is further configured to adjust the set of control laws so that the vibration signal corresponding to the anomalous vibration behavior is below an operational limit.

17. The system of claim 12, wherein the vibration signal is a vibration signature representing amplitudes of one or more tracked orders of the engine shaft and the at least one oscillatory component of the engine shaft for various speeds of the engine shaft of the gas turbine engine.

18. A non-transitory computer-readable storage medium storing instructions that, when executed, cause a processor to:

receive, by an adaptive control module for a gas turbine engine, a power input signal;

receive, by the adaptive control module, from an engine vibration sensor, a vibration signal indicative of a first operating condition of an engine shaft of the gas turbine engine and a second operating condition of at least one oscillating component coupled to the engine shaft of the gas turbine engine, wherein the vibration signal represents vibration behavior of the engine shaft and the at least one oscillating component;

determine, by the adaptive control module, a vibration feature signal based on the vibration signal, wherein the vibration feature signal includes vibration characteristics of the vibration signal;

compare, by the adaptive control module, the vibration feature signal with an operational baseline of the gas turbine engine, wherein the operational baseline represents a previous operating condition of the engine shaft and the at least one oscillating component;

identify, by the adaptive control module and based on the comparison of the vibration feature signal with the operational baseline, anomalous vibration behavior for at least one of the engine shaft or the at least one oscillating component;

adjust, by the adaptive control module, a set of control laws for each of a first engine control variable and a second engine control variable to reduce the identified anomalous vibration behavior for at least one of the engine shaft or the at least one oscillating component, wherein each of the first and second engine control variables are controlled by one or more engine actuators;

determine, by the adaptive control module and using the set of control laws, a power demand signal based on inputs including the power input signal, wherein the power demand signal includes a first power demand signal associated with the first engine control variable and a second power demand signal associated with the second engine control variable; and output, by the adaptive control module, the power demand signal to the one or more engine actuators.

* * * * *

UNITED STATES PATENT AND TRADEMARK OFFICE
CERTIFICATE OF CORRECTION

| | |
|---|---|
| PATENT NO. | : 10,941,725 B2 |
| APPLICATION NO. | : 15/634640 |
| DATED | : March 9, 2021 |
| INVENTOR(S) | : Keith Calhoun |

Page 1 of 1

It is certified that error appears in the above-identified patent and that said Letters Patent is hereby corrected as shown below:

In the Claims

Column 15, Claim 1, Line numbers 39-40, "power input signal and the vibration feature" should read --power input signal--

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*